United States Patent
Coppini et al.

(10) Patent No.: US 6,930,132 B2
(45) Date of Patent: Aug. 16, 2005

(54) USE OF A POLYPROPYLENE BASED COMPOSITION FOR EXPANDED BEADS

(75) Inventors: Valerio Coppini, Sarralbe (FR); Herve Cuypers, Ceroux-Mousty (BE); Emmanuel Delaite, Braine-le-Comte (BE)

(73) Assignee: BP Belgium NV, Berchem (BE)

( * ) Notice: Subject to any disclaimer, the term of this patent is extended or adjusted under 35 U.S.C. 154(b) by 0 days.

(21) Appl. No.: 10/491,844
(22) PCT Filed: Oct. 17, 2002
(86) PCT No.: PCT/EP02/11720
§ 371 (c)(1),
(2), (4) Date: Apr. 5, 2004
(87) PCT Pub. No.: WO03/035747
PCT Pub. Date: May 1, 2003

(65) Prior Publication Data
US 2004/0249004 A1 Dec. 9, 2004

(30) Foreign Application Priority Data
Oct. 25, 2001 (WO) ................ PCT/EP01/12571

(51) Int. Cl.⁷ .............. C08J 9/16; C08L 23/14
(52) U.S. Cl. ............ 521/59; 521/134; 525/191; 525/240
(58) Field of Search ........... 521/59, 134; 525/240, 525/191

(56) References Cited

U.S. PATENT DOCUMENTS 6,040,348 A * 3/2000 Delaite et al. ............ 521/59

OTHER PUBLICATIONS

T. Whelan, Polymer Technology Dictionary, Chapman & Hall, London, 1994, p. 334.*

* cited by examiner

*Primary Examiner*—James J. Seidleck
*Assistant Examiner*—Itrina S. Zemel
(74) *Attorney, Agent, or Firm*—James R. Henes; David P. Yusko

(57) ABSTRACT

Use of a polypropylene based composition (C) comprising (a) from 5 to 95% by weight of a random copolymer of propylene (A) containing from 0.5 to 12 mole % of at least one comonomer chosen from ethylene and/or an alpha-olefin containing from 4 to 6 carbon atoms, and having an $MFI_A$ in the range from 0.01 to 5 g/10 min, (b) from 95 to 5% by weight of a random copolymer of propylene (B) containing from 0.5 to 12 mole % of at least one comonomer chosen from ethylene and/or an alpha-olefin containing from 4 to 6 carbon atoms, and having an $MFI_B$ in the range from 15 to 1000 g/10 min, said composition (C) being such that random copolymers (A) and (B) contain the same comonomer(s) and have, for each comonomer, substantially the same comonomer content, for the manufacturing of expanded beads.

10 Claims, No Drawings

USE OF A POLYPROPYLENE BASED COMPOSITION FOR EXPANDED BEADS

The present invention relates to the use of a polypropylene based composition for the manufacture of expanded beads. Another object of the present invention is to provide foamed articles made of these expanded beads.

Patent application EP-A-1059332 describes multimodal propylene homopolymers. However, these multimodal propylene homopolymers have high melting points, and consequently the pressure resistance of the closed vessel and the operating temperature to be used for preparing expanded beads from these, has to be increased. Furthermore, when the thus-prepared expanded beads are subjected to moulding, the moulding machine used for converting the expanded beads into foamed articles has to be able to withstand a high mould clamping force and a high operating temperature.

Patent applications EP-A-0334313 and EP-A-0780206 describe respectively the use of propylene/butene-1 and propylene/ethylene random copolymers. However, expanded beads manufactured from those random propylene copolymers suffer from long cycling times during moulding to obtain foamed articles.

It is an object of the present invention to solve the above-mentioned problems by using a particular polypropylene based composition for the production of expanded beads.

According to a first aspect, the present invention relates to the use for the manufacturing of expanded beads of a polypropylene based composition (C) comprising
(a) from 5 to 95% by weight of a random copolymer of propylene (A) containing from 0.5 to 12 mole % of at least one comonomer chosen from ethylene and/or an alpha-olefin containing from 4 to 6 carbon atoms, and having an $MFI_A$ in the range from 0.01 to 5 g/10 min,
(b) from 95 to 5% by weight of a random copolymer of propylene (B) containing from 0.5 to 12 mole % of at least one comonomer chosen from ethylene and/or an alpha-olefin containing from 4 to 6 carbon atoms, and having an $MFI_b$ in the range from 15 to 1000 g/10 min,
said composition (C) being such that random copolymers (A) and (B) contain the same comonomer(s) and have, for each comonomer, substantially the same comonomer content.

According to a second aspect, the present invention relates to expanded beads of a polypropylene based composition (C) comprising
(a) from 5 to 95% by weight of a random copolymer of propylene (A) containing from 0.5 to 12 mole % of at least one comonomer chosen from ethylene and/or an alpha-olefin containing from 4 to 6 carbon atoms, and having an $MFI_A$ in the range from 0.01 to 5 g/10 min,
(b) from 95 to 5% by weight of a random copolymer of propylene (B) containing from 0.5 to 12 mole % of at least one comonomer chosen from ethylene and/or an alpha-olefin containing from 4 to 6 carbon atoms, and having an $MFI_b$ in the range from 15 to 1000 g/10 min,
said composition (C) being such that random copolymers (A) and (B) contain the same comonomer(s) and have, for each comonomer, substantially the same comonomer content.

A third aspect of the present invention provides foamed articles manufactured from the expanded beads according to the present invention.

Within the framework of the present invention, by "substantially the same content for each comonomer in the random copolymers (A) and (B)" it is meant that any comonomer content difference between random copolymer (A) and random copolymer (B) is lower than 1.5 mole %, preferably lower than 1.1 mole %.

The polypropylene based composition (C) used in the present invention preferably comprises from 40 to 90% by weight of the random copolymer (A), and from 60 to 10 % by weight of the random copolymer (B). A polypropylene based composition (C) used in the present invention comprising from 50 to 85% by weight of the random copolymer (A), and from 50 to 15% by weight of the random copolymer (B) is especially preferred, because it permits particularly short moulding cycle times during the manufacture of foamed articles and can be produced in an economically advantageous manner.

The random copolymers (A) and (B) of the composition (C) used in the present invention are selected from random copolymers of propylene with at least one comonomer chosen from ethylene and/or an alpha-olefin containing from 4 to 6 carbon atoms. Among the latter, butene-1 is preferred. Although copolymers containing more than one comonomer are in no way excluded from the scope of this invention, propylene random copolymers containing only ethylene or only butene-1 as comonomer, are preferred.

The random copolymers (A) and (B) used in the composition (C) according to the present invention contain from 0.5 to 12 mole %, preferably from 1 to 10 mole % of comonomer(s). A comonomer(s) content lower than 0.5 mole % leads to a composition having a high melting point, and consequently the temperature or the pressure required to obtain sufficient melt adhesion during moulding of the expanded beads made of this composition is too high. A comonomer(s) content higher than 12 mole % is detrimental to the compressive strength and heat resistance of the final foamed articles. A comonomer(s) content in the range from 2 to 8 mole % is especially preferred. The comonomer(s) content of random copolymers (A) and (B) is determined by Fourier transform IR spectroscopy on the polypropylene based composition (C) used in the present invention, which is converted into a 200 µm pressed film. Absorption bands located at 732 and 720 $cm^{-1}$ are used to determine the ethylene content of the random copolymers (A) and (B). The butene-1 content is determined using the absorption band at 767 $cm^{-1}$.

The melt flow index of random copolymer (A) ($MFI_A$) ranges preferably from 0.05 to 4 g/10 min, more preferably from 0.05 to 3 g/10 min. The MFI is measured according to ASTM D 1238 standard (at 230° C. under a load of 2.16 kg). $MFI_A$ values in the range from 0.2 to 3 g/10 min are especially preferred.

The MFI of random copolymer (B) ($MFI_B$), measured in the same way as $MFI_A$, may range from 50 to 800 g/10 min, but preferably ranges from 25 to 500 g/10 min. $MFI_B$ values of copolymer (B) in the range from 30 to 300 g10 min are especially preferred.

A composition (C) used in the present invention wherein $MFI_A$ ranges from 0.2 to 3 g/10 min and $MFI_B$ ranges from 30 to 300 g/10 min is most particularly preferred.

The MFI of the polypropylene composition (C) ($MFI_c$, measured in the same way as $MFI_A$) used in the present invention, preferably lies in the range from 1 to 30 g/10 min. Advantageously, $MFI_C$ is at least 2, and at most 15 g/10 min.

The polypropylene based composition (C) used in the present invention has generally a molecular weight distribution (MWD) measured by steric exclusion chromatography as explained hereafter, of at least 8, preferably of at least 10. A polypropylene based composition (C) having a MWD of at least 12 and particularly at least 16 is especially preferred, because it allows to obtain particularly short cycle times during the moulding of expanded beads made of it.

The process to manufacture the polypropylene based composition (C), which is accomplished by mixing random copolymer (A) and random copolymer (B), constitutes another embodiment of the present invention. This mixing process can be achieved by any process whatsoever. Random copolymers (A) and (B) can be mixed by preparing random copolymer (A) or (B) and then, in the same medium or in a different medium into which random copolymer (A) or (B) is introduced, preparing random copolymer (B) or (A). Random copolymers (A) and (B) can also be mixed mechanically. According to this method, random copolymers (A) and (B) are prepared separately and melt blended afterwards. According to this variant, the random copolymer (B) may be manufactured from random copolymer (A) which is depolymerized in order to raise its MFI to the desired value. Depolymerization is generally carried out by "visbreaking" into an extruder at very high shear rate, usually by mixing it with an organic peroxide which decomposes at the temperature used during melt blending, generally at a temperature between 150 and 350° C.

The polypropylene based composition (C) used in the present invention is preferably manufactured by a successive copolymerization process, comprising at least two consecutive steps. Each of the polymerization steps in the process may be carried out, under general conditions well known to those skilled in the art, in the same polymerization medium or in different polymerization media. Generally random copolymer (A) is prepared first, and random copolymer (B) prepared in the presence of random copolymer (A) from the first step. These steps may be carried out, each independently of each other, in suspension in an inert hydrocarbon diluent, in liquid propylene or in gas phase (using a stirred bed or preferably a fluidized bed).

The random copolymers (A) and (B) used in the composition (C) according to the present invention may be prepared in the presence of any known catalytic system which is sufficiently productive and stereospecific, allowing propylene to be polymerized in a sufficiently isotactic form and making it possible to incorporate the required amounts of comonomer(s) into the polymer. These catalytic systems, like the general conditions for synthesizing these polymers, are well known to those skilled in the art.

The MFI of the random copolymers (A) and (B) may be adjusted during polymerization by adding one or more known agents for adjusting their molecular weight. Hydrogen is most commonly used. Its relative concentration in the medium for preparing the random copolymer (B) is generally markedly higher than in the medium for preparing the random copolymer (A), on account of the markedly higher MFI to be conferred on the former.

The required amounts of monomers and of agent(s) for adjusting the molecular weight may be introduced into the polymerization medium in a continuous or discontinuous manner.

The polypropylene based composition (C) used in the present invention may contain, besides the said random copolymers (A) and (B), other polymers and/or conventional additives, such as stabilizers, pigments, colorants, fillers, fire retardants, antistatic agents, lubricants, slip agents, etc. Generally, the sum of the amounts of random copolymers (A) and (B) accounts for at least 60% by weight, preferably at least 80% by weight of the polypropylene based composition (C).

The use of the polypropylene based composition (C) according to the present invention allows to obtain the following combination of advantageous properties:
1) an ability to be homogeneously expanded,
2) a short cycle time during moulding of the expanded beads made of it, and
3) high compressive strengths of foamed articles moulded from these expanded beads.

The production of expanded granules and the subsequent moulding thereof into cellular articles can be carried out in a conventional manner such as described in U.S. Pat. No. 6,077,875, EP 0317995 and U.S. Pat. No. 4,626,555.

For example, polypropylene expanded granules can be produced by a process comprising dispersing particles of the polypropylene resin in a dispersion medium such as water in a closed vessel, feeding a blowing agent into the closed vessel while pressurizing, heating and stirring the dispersion, and then releasing the resin particles and the dispersion medium from the vessel under a pressure lower than the internal pressure of the vessel, generally under atmospheric pressure, thereby expanding the resin particles. At this time, it is preferred that the internal temperature of the vessel be from [the melting point of the resin −20° C.] to [the melting point of the resin +10° C.]. The expansion pressure depends on the desired expansion ratio of the expanded granules and on the base resin and foaming agent used and is usually from 5 to 60 bars.

The resin particles for the production of the expanded granules of the present invention can be obtained, for example, by extruding the molten resin from the extruder into a strand and cutting the strand. The weight of the particles is typically 0.1 to 30 mg, preferably from 0.2 to 10 mg.

The dispersion medium is not limited to water and any medium may be used which does not dissolve the resin particles. The amount of dispersion medium is generally from 100 to 1000 parts by weight, preferably from 150 to 500 parts by weight per 100 parts by weight of the resin particles.

The foaming agent used in the above-described process includes organic and inorganic foaming agents. Examples of organic foaming agents include aliphatic hydrocarbons such as propane, butane, pentane, hexane, heptane, etc.; alicyclic hydrocarbons such as cyclobutane, cyclopentane, etc.; and halogenated hydrocarbons such as chlorofluoromethane, trichlorofluoromethane, dichlorodifluoromethane, dichlorotetrafluoromethane, methyl chloride, ethyl chloride, methylene chloride, etc.; either alone or in combinations of two or more thereof. Examples of the inorganic foaming agent include nitrogen, carbon dioxide, argon, helium and air. These foaming agents may be used in any combination.

The amount of the foaming agent depends on the expansion ratio of the expanded granules and on the base resin and foaming agent used. However, the amount is generally about 5 to 50 parts by weight for the organic foaming agent or about 0.5 to 30 parts by weight for the inorganic foaming agent, per 100 parts by weight of the polypropylene particles.

A dispersing agent is generally added to the dispersion medium. Examples of the dispersing agent include fine particles of inorganic suspending agents such as aluminium oxide, titanium oxide, calcium carbonate, calcium tertiary phosphate, basic magnesium carbonate, basic zinc carbonate, kaolin, mica, clay, etc. When a dispersing agent is used, an anionic surfactant such as sodium dodecylbenzenesulphonate, sodium alkylsulphonate, sodium alkylsulphates, sodium olefin sulphates or sodium dialkylsulphosuccinates is often added as a dispersion aid in combination. Usually, the amount of the dispersing agent is from 0.1 to 2 parts by weight per 100 parts by weight of the resin particles, and the amount of dispersion aid is from 0.0001 to 0.2 part by weight per 100 parts by weight of the resin particles.

The expanded granules obtained by the process described above can be converted into granules having a higher expansion ratio by subjecting them to a pressurizing treatment with pressurized air to apply an internal pressure thereto, and then heating them with steam or heated air.

The expanded granules according to the present invention generally have a bulk density ranging from 10 to 300 kg/m3.

The cellular or moulded articles made from the expanded granules of the present invention can be obtained by moulding the expanded granules using any known heating and moulding method. Generally, the expanded granules are poured into a mould and heated with steam or the like, whereby they are fusion-bonded to obtain an expansion-moulded article. If required, the expanded granules are subjected to a pressurizing treatment prior to their addition to the mould to increase the internal pressure of the beads. The pressurizing treatment is generally carried out by pressurizing the foamed beads with air in a pressure tank.

In addition to the foregoing description of the invention, the following examples are provided to illustrate the present invention.

Melting points (Tm) of the polypropylenes were determined by differential scanning calorimetry with a Perkin-Elmer DSC-System. The molecular weight distribution is defined as the ratio of the weight average molecular weight (Mw) to the number average molecular weight (Mn); Mw and Mn were determined by steric exclusion chromatography (GPC-150C apparatus manufactured by WATERS Co Ltd) at 135° C. using a trichlorobenzene solution having a polymer concentration of 0.5 g/l and a polystyrene gel column, e.g. WATERS STYRAGEL HMW 6E available from WATERS Co. Ltd. The flexural modulus has been measured according to ASTM D 790 on injection-moulded samples having a thickness of 4 mm. The other symbols used in the examples are explained as follows below:

$MFI_c$; melt flow index of the composition (C), measured according to ASTM D 1238 standard at 230° C. under a load of 2.16 kg.

$MFI_{10(c)}$: melt flow index of the composition (C), measured according to ASTM D 1238 standard at 230° C. under a load of 10 kg.

$MFI_A$: melt flow index of random copolymer (A), measured according to ASTM D 1238 standard at 230° C. under a load of 2.16 kg on a sample of this copolymer; in case the polypropylene of the composition (C) is obtained by polymerization comprising two consecutive steps, $MFI_A$ is measured on a sample taken from the first step.

$MFI_B$: melt flow index of random copolymer (B), calculated according to the following equation: log $MFI_c$=([A]/100) log$MFI_A$+ ([B]/100)log $MFI_B$

[A]: weight % of random copolymer (A) with respect to the total weight of random copolymers (A) and (B), estimated on the titanium content of a sample of random copolymer (A) and the titanium content of a sample of the polypropylene of the composition (C) used in the present invention.

[B]: weight % of random copolymer (B) with respect to the total weight of random copolymers (A) and (B), calculated according to the following equation: [B]=100−[A]

C2 total: weight % of total ethylene in the polypropylene of composition (C) with respect to the total weight of random copolymers (A) and (B), determined by IR spectroscopy as described before.

C2A: weight % of total ethylene in random copolymer (A) with respect to the total weight of random copolymer (A), determined by IR spectroscopy as described before on a sample of random copolymer (A).

$C_2B$: weight % of total ethylene in random copolymer (B) with respect to the total weight of random copolymer (B), determined according to the following equation:

$$C2_B = \frac{C2 \text{ total} - ([A]/100 \times C2_A)}{[B]/100}$$

EXAMPLE 1

A polypropylene comprising 65 weight % of random copolymer (A) and 35 weight % of random copolymer (B) was continuously prepared in two successively interconnected reactors of the same volume, the first being used to manufacture random copolymer (A) which is transferred into the second wherein random copolymer (B) is manufactured.

The polymerization in both reactors was performed in liquid propylene, in the presence of a catalyst system comprising a solid titanium trichloride as described in example 1 of U.S. Pat. No. 4,210,729 and diethylaluminiumchloride, such that the atomic ratio Al/Ti equalled 10. The other polymerization conditions and the characteristics of the random copolymers (A) and (B) are summarized in table 1. The polymer was recovered by submitting the slurry extracted from the second reactor to a flashing treatment in the presence of water, followed by a stripping at pH 12 and final drying.

100 parts by weight of the resulting polypropylene were blended with 0.1 part by weight of tetrakis[methylene(3,5-di-tertiobutyl-4-hydroxyhydrocinnamate)]methane, 0.1 parts by weight of distearylpentaerythritoldiphosphite and 0.05 parts by weight of calcium stearate, and the resulting blend pelletized on a twin-screw extruder; the characteristics of the resulting composition (C) are summarized in Table 1. This composition was converted into expanded beads, which were subsequently moulded into foamed articles.

COMPARATIVE EXAMPLE 2R

Example 1 was repeated, except that random copolymer (B) was polymerized in the same conditions as random copolymer (A), and consequently had the same MFI value. The obtained polymer had the characteristics as listed in Table 1, and was pelletized according to the conditions used in Example 1.

This composition was also converted into expanded beads, which were subsequently moulded into foamed articles. The cycle time for the moulding was significantly higher than for the expanded beads obtained from the composition as described in Example 1.

TABLE 1

| Polymerization conditions | Unit | Ex. 1 | Ex. 2R |
|---|---|---|---|
| Reactor 1 (Random cop. (A)) | | | |
| Pressure | $10^5$ Pa | 39 | 35 |
| Temperature | ° C. | 50 | 50 |
| Hydrogen | mole % | 0.09 | 0.22 |
| Ethylene | mole % | 0.29 | 0.29 |
| Propylene | mole % | 94.5 | 97.1 |
| Residence time | hour | 1.61 | 2.03 |
| Reactor 2 (Random cop. (B)) | | | |
| Pressure | $10^5$ Pa | 39 | 35 |
| Temperature | ° C. | 60 | 50 |
| Hydrogen | mole % | 1.57 | 0.25 |
| Ethylene | mole % | 0.30 | 0.29 |
| Propylene | mole % | 90.9 | 94.4 |
| Residence time | hour | 1.18 | 1.47 |

TABLE 1-continued

| Polymerization conditions | Unit | Ex. 1 | Ex. 2R |
|---|---|---|---|
| Characteristics | | | |
| Random copolymer (A) | Weight % | 65 | — |
| $MFI_A$ | g/10 min | 1.1 | 6.2 |
| $C2_{(A)}$ | Weight % | 2.3 | 2.4 |
| Random copolymer (B) | Weight % | 35 | — |
| $MFI_B$ | g/10 min | 170 | 6.2 |
| $C2_{(B)}$ | Weight % | 2.3 | 2.4 |
| Overall composition (C) | | | |
| $MFI_C$ | g/10 min | 6.5 | 6.2 |
| $MFI_{10(C)}$ | g/10 min | 177 | 118 |
| $MFI_{10(C)}/MFI_C$ | | 27.2 | 19.0 |
| C2 total | Weight % | 2.3 | 2.4 |
| Tm | °C. | 145.3 | 145.8 |
| Mw/Mn | — | 14.8 | 7.2 |
| Flexural modulus | $10^5$ Pa | 1110 | 984 |

What is claimed is:

1. Expanded beads comprising a polypropylene based composition (C) comprising
   (a) from 5 to 95% by weight of a random copolymer of propylene (A) containing from 0.5 to 12 mole % of at least one comonomer chosen from ethylene and/or an alpha-olefin containing from 4 to 6 carbon atoms, and having an $MFI_A$ in the range from 0.01 to 5 g/10 min,
   (b) from 95 to 5% by weight of a random copolymer of propylene (B) containing from 0.5 to 12 mole % of at least one comonomer chosen from ethylene and/or an alpha-olefin containing from 4 to 6 carbon atoms, and having an $MFI_B$ in the range from 15 to 1000 g/10 min, said composition (C) being such that random copolymers (A) and (B) contain the same comonomer(s) and have, for each comonomer, substantially the same comonomer content.

2. Expanded beads according to claim 1, wherein the random copolymer (A) has an $MFI_A$ in the range from 0.2 to 3 g/10 min, and the random copolymer (B) has an $MFI_B$ in the range from 30 to 300 g/10 min.

3. Foamed articles manufactured from the expanded beads as claimed in claim 1.

4. Expanded beads according to claim 1 wherein the polypropylene based composition (C) comprises from 50 to 85% by weight of random copolymer (A), and from 50 to 15% by weight of random copolymer (B).

5. Expanded beads according to claim 1 wherein the comonomer(s) content of the random copolymer (A) and the comonomer(s) content of random copolymer (B) range from 2 to 8 mole %.

6. Expanded beads according to claim 1 wherein the random copolymers (A) and (B) are both random copolymers of propylene and ethylene.

7. Expanded beads according to claim 1 wherein the random copolymers (A) and (B) are both random copolymers of propylene and butene-1.

8. Expanded beads according to claim 1 wherein the polypropylene based composition (C) has a molecular weight distribution of at least 8.

9. Expanded beads according to claim 1 wherein the polypropylene based composition (C) has an $MFI_c$ in the range of from 1 to 30 g/10 min.

10. A method for making expanded beads comprising the steps of
   (a) dispersing in a dispersion medium in a closed vessel particles of a polypropylene based resin composition (C) comprising
      (i) from 5 to 95% by weight of a random copolymer of propylene (A) containing from 0.5 to 12 mole 5 of at least one comonomer chosen from ethylene and/or an alpha-olefin containing from 4 to 6 carbon atoms, and having an $MFI_A$ in the range from 15 to 1000 g/10 min,
      (ii) from 95 to 5% by weight of a random copolymer of propylene (B) containing from 0.5 to 12 mole % of at least one comonomer chosen from ethylene and/or an alpha-olefin containing from 4 to 6 carbon atoms, and having an $MFI_B$ in the range from 15 to 1000 g/10 min, said composition (C) being such that random copolymers (A) and (B) contain the same comonomer(s) and have, for each comonomer, substantially the same comonomer content,
   (b) feeding a blowing agent into the closed vessel while pressurizing the vessel,
   (c) heating and stirring the dispersion, and
   (d) releasing the resin particles and the dispersion medium from the vessel under a pressure lower than the internal pressure of the vessel.

* * * * *